US005768257A

United States Patent [19]
Khacherian et al.

[11] Patent Number: 5,768,257
[45] Date of Patent: Jun. 16, 1998

[54] INPUT BUFFERING/OUTPUT CONTROL FOR A DIGITAL TRAFFIC SWITCH

[75] Inventors: Todd L. Khacherian, Moorpark; Michael Jon Nishimura, Torrance; Michael Kenneth Wilson, Agoura Hills; John Daniel Wallner; Christopher Leo Hoogenboom, both of Calabasas; John W. Bailey, Agoura Hills, all of Calif.

[73] Assignee: Xylan Corporation, Calabasas, Calif.

[21] Appl. No.: 679,360

[22] Filed: Jul. 11, 1996

[51] Int. Cl.[6] .................................................. H04J 3/14
[52] U.S. Cl. ............................................ 370/229; 370/413
[58] Field of Search ............................. 370/229, 230, 370/231, 232, 234, 235, 252, 253, 412, 413, 414, 415, 416, 417, 418, 419, 428, 429, 395

[56] References Cited

U.S. PATENT DOCUMENTS

| 5,325,356 | 6/1994 | Lyles | 370/397 |
|---|---|---|---|
| 5,446,738 | 8/1995 | Kim et al. | 370/395 |
| 5,448,559 | 9/1995 | Hayter et al. | 370/398 |
| 5,511,070 | 4/1996 | Lyles | 370/411 |
| 5,550,823 | 8/1996 | Irie et al. | 370/413 |
| 5,555,264 | 9/1996 | Sallberg et al. | 370/414 |

OTHER PUBLICATIONS

Chao, H. Jonathan, "Abacus switch figures ATM I/O", Design Supercon '96: Communications Trends, *Electronic Engineering Times*, pp. 68 and 78 (Jan. 15, 1996).

McKeown & Izzard, High Performance Switching Internet Pub. at http://tiny-tera.Stanford.EDU/tiny-tera/papers/index.html (Nov. 1995).

Primary Examiner—Alpus H. Hsu
Assistant Examiner—Kwang B. Yao
Attorney, Agent, or Firm—Scot A. Reader

[57] ABSTRACT

The present invention, generally speaking, uses input buffering and output control to provide a high-speed, high-performance digital traffic switch. Dropped discrete information units (cells) are dropped at the input port, and so will not be transmitted across the switch fabric. This reduces the traffic load on the switch fabric during congested periods, and makes the switch fabric easier to design and expand. Input buffering/output control allows for the use of smaller buffers than output buffered/output control architectures for the same level of "discrete information unit (cell) drop" performance, and scales well to larger systems. Input buffering/output control provides all the information necessary to the output (data flow) controller necessary to implement very precise control algorithms. These algorithms can then administer switch fabric admission polices and contract enforcement fairly across all input ports.

16 Claims, 5 Drawing Sheets

FIG. 5

INPUT BUFFERING/OUTPUT CONTROL FOR A DIGITAL TRAFFIC SWITCH

FIELD OF THE INVENTION

The present invention relates to digital LAN and WAN traffic switches, particularly ATM (Asynchronous Transfer Mode) switches.

STATE OF THE ART

Figure 1:
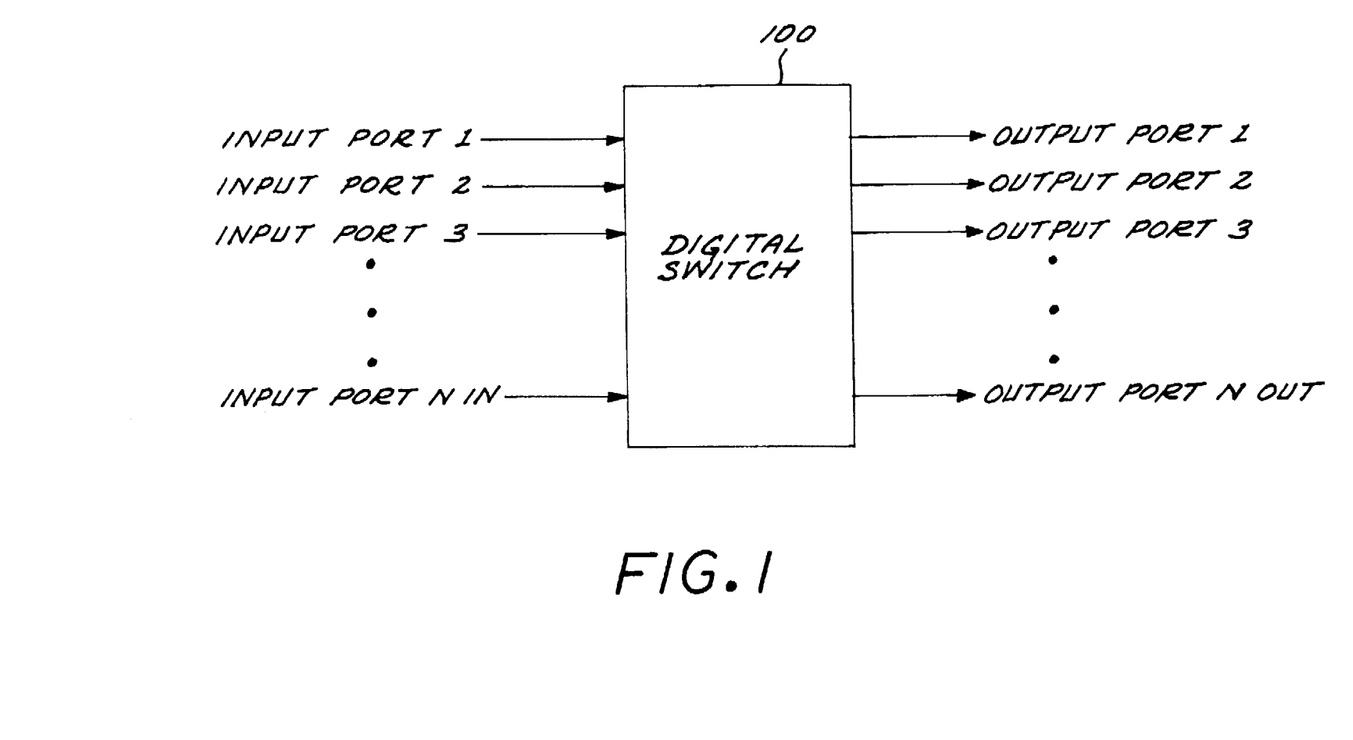
FIG. 1 is a generalized block diagram of a digital traffic switch.

An ATM cell switch takes cells from many sources, and routes them to many destinations. Such a switch may be hardware-based, or hardware and software based. The architecture can be generalized as shown in FIG. 1. Cells arrive on input ports 1 to $N_{in}$ and are switched through a switch "fabric" 100 to various ones of output ports 1 to $N_{out}$.

A "cell" is a fixed size unit (53 bytes), which constitutes a fraction of a larger communication. Cells come in on input ports, and get routed to output ports.

Sometimes, "collisions" take place between cells. That is, cells come in on two or more input ports that are destined for the same output port. There are two scenarios which describe the condition when two or more cells are destined to the same output port: 1) momentary contention or cell collision; and 2) sustained contention or congestion.

In either case, the collisions create the need for "queuing," where one or more cells have to wait in line to be delivered to the output port.

With some architectures, even when there are no collisions, "blocking" can take place. Blocking occurs when a cell cannot be delivered because the delivery of other cells is taking up the resources necessary for the delivery of the blocked cell. This is often referred to as "head of line" (HOL) blocking. Blocking is undesirable, since it can delay the delivery of other cells. Also, blocked cells must be queued, just like cells delayed due to collisions.

Due to these inevitable delays in delivery, a successful architecture must properly queue cells for delivery. Such queuing is referred to herein as "buffering". Buffering requires buffer control. Buffer control tells the switch buffers when to release a cell from a queue for delivery to the output port.

Even with buffer control, it is sometimes necessary to "drop" cells. For instance, when cells come in on input ports 1 and 2, all destined for output port 3, it is often the situation that more cells come in than can be output from port 3. The cells begin to be queued up in the buffers. If this situation continues long enough, the buffers get filled up, and cells need to be thrown away, or "dropped." A good design minimizes the amount of cells that need to be dropped.

Prior solutions to buffer control fall into two basic categories: 1) input buffering with input control; and 2) output buffering with output control.

With input buffering and input control, cells are queued at the input ports, and released to the output ports based on the state of the input queues. The advantage of buffering at the input is that it requires smaller buffers to maintain the same levels of dropping when compared to output buffering. Also, when cells are buffered at the input, cells can be dropped before going across the switch fabric. This reduces the total traffic load on the switch fabric, which reduces the chance of chronic congestion at the output port.

The problem with input buffering and input control is that cells are released through the switch fabric based on the state of each individual input buffer. That is, when there are cells in the input buffer, they are released to the output ports based on metrics that are available at the input port: size of the input buffers, incoming rate, length of time since a cell was last released, etc. This often leads to non-optimal control strategies, since input control segregates flow control information such that any one input controller does not have status information on its peer input controller.

With output buffering and output control, cells are immediately passed through from the input port, through the switch fabric, and to a buffer on the output port. There, cells are released from the queues to go out the output ports. The control is based on the state of the output port.

The advantage of output buffering is that the buffers can be controlled with the very precise information gathered at the output port. For instance, if an output port is busy transmitting a cell, there is no use releasing another one. Conversely, if an output port is idle, ideally a cell would be immediately released to it for transmission. With output buffering and output control, all the information is available at the output port to implement very precise control algorithms.

Problems encountered with output buffering and output control include increased traffic and increased buffer size. With output buffering and output control, cells are dropped after they go across the switch fabric; this creates extra traffic across the switch fabric, which exacerbates congestion states. Output buffering and output control also requires larger buffers to maintain the same level of "cell drop" performance as input buffering, since cells can be delivered to output buffers from several sources. This also means that output buffers can be filled very rapidly, and so must support the aggregate input port bandwidth. This problem becomes insurmountable as the number of ports in the system increases. In general, instantaneous bandwidth into an output queue is linear with the number of ports. This leads to exponential growth in total queue sizes as the number of ports increases.

What is needed, then, is an improved buffer control arrangement suitable for a high-speed, high-performance digital traffic switch.

SUMMARY OF THE INVENTION

The present invention, generally speaking, uses input buffering and output control to provide a high-speed, high-performance digital traffic switch. This approach solves the problems noted above with respect to the prior art. More particularly, in accordance with one embodiment of the invention, a method is provided for controlling buffering of discrete information units of digital data within a digital switch having multiple input ports, multiple output ports, a switch fabric, an input buffer control unit, an input buffer unit, an output data flow control unit, and an output rate buffer unit. The switch fabric has having an input side and an output side, for switching a discrete information unit received at any of the input ports to any of the output ports. Discrete information units received at the input ports are buffered within the input buffer unit, and the input buffer control unit then generates a "Request" to release (from the input buffer unit) a "discrete information unit" destined for a particular output port. The output data flow control unit monitors status of the output port and, in response to the "Request", generates a "Grant" to release (from the input buffer control unit) the discrete information unit destined for the particular output port.

In this approach, dropped discrete information units (cells) are dropped at the input port, and so will not be transmitted across the switch fabric. This reduces the traffic load on the switch fabric during congested periods, and allows the output stage of the switch fabric to be designed with only the bandwidth required by the output port. Because the traffic load across the switch fabric is regulated by the output port, this architecture scales well to larger systems.

Input buffering and output control allows for the use of smaller buffers for the same level of "discrete information unit (cell) drop" performance that would be provided by output buffering and output control.

Input buffering and output control provides all the information to the output data flow controller necessary to implement very precise control algorithms. These algorithms can then administer switch fabric admission policies and contract enforcement fairly across all input ports.

BRIEF DESCRIPTION OF THE DRAWING

The present invention may be further understood from the following description in conjunction with the appended drawing. In the drawing.

DETAILED DESCRIPTION OF THE PREFERRED EMBODIMENT

Figure 2:
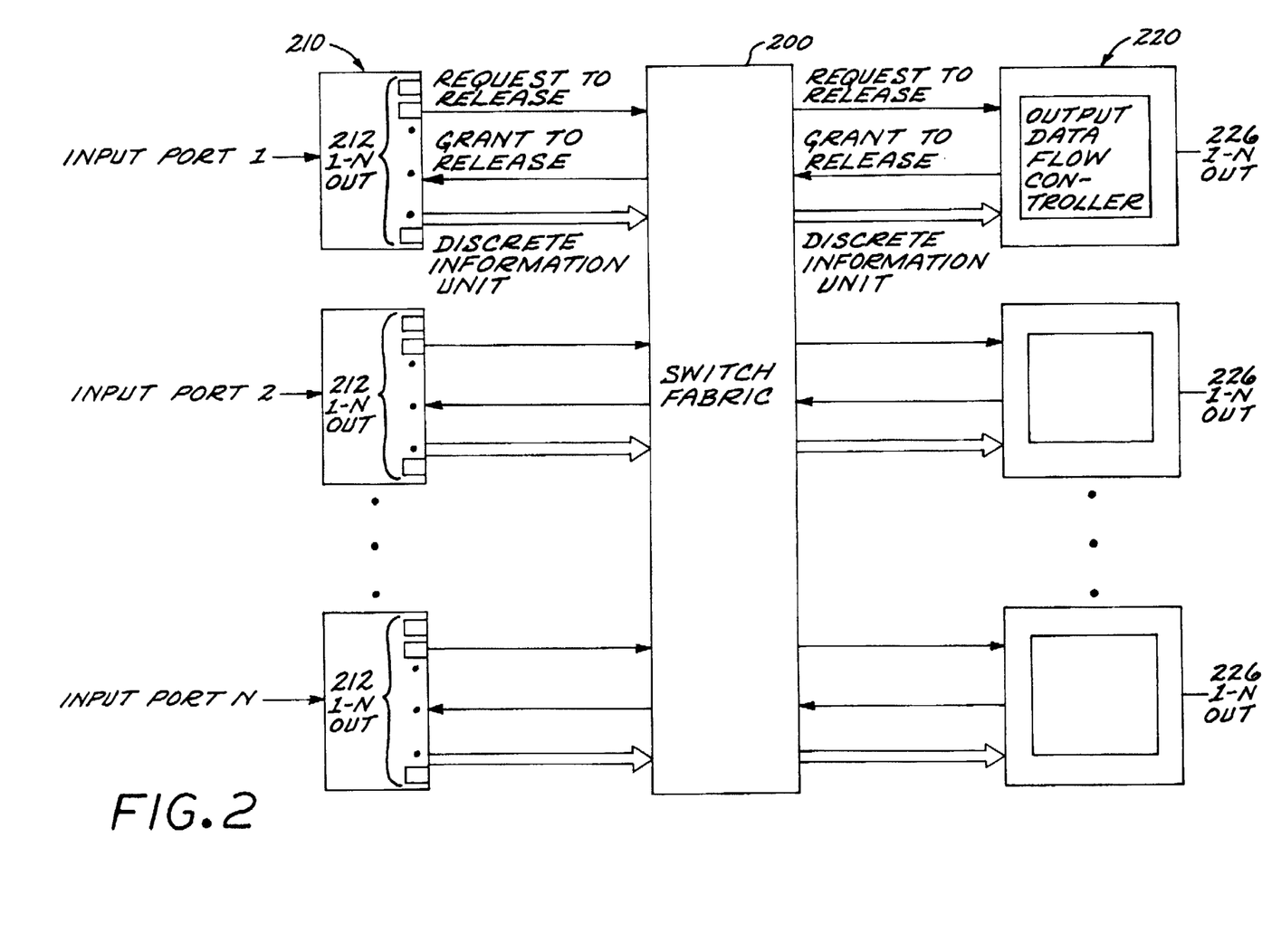
FIG. 2 is a block diagram of a digital traffic switch in which the present invention may be used.

Referring to FIG. 2, the general architecture of a digital switch incorporating the present invention is shown. Multiple inputs and multiple outputs are coupled via a switch fabric 200 such that every input port(and its associated input buffer control unit) may communicate with every output port (and its associated output data flow control unit), and every output port (and its associated output data flow control unit) may communicate with every input port (and its associated input buffer control unit). At any given instant in time, a subset (or all) of the source inputs ports 210 will be receiving digital traffic destined for a subset (or all) of destination output ports 220. Digital traffic may therefore be imagined as flowing from left to right, from source input ports 210 to destination output ports 220.

Within each source input port 210, there is an input buffer control unit which dynamically segregates the discrete information units by destination output port and by priority for storage within the input buffer unit. For a switch having N ports, and providing L levels of priority, each input buffer unit will therefore have N groups of output queues, each group having L priority queues, for a total of N×L queues. Collectively, the queues $212_{(1-Nout)\times(1-L)}$ of the input port buffer unit 210 function as an output buffer because they queue discrete information units based on the destination output port and the priority level of the data. Further, each group of queues, where a group is the L priority queues for a destination output port, is controlled by the respective destination's output data flow control unit. The input port buffer control unit cannot release a discrete information unit from its input buffer unit to the destination output port (via the switch fabric and output rate buffer unit) without the explicit consent of the destination port's output data flow control unit $2262_{1-Nout}$.

Figure 3:
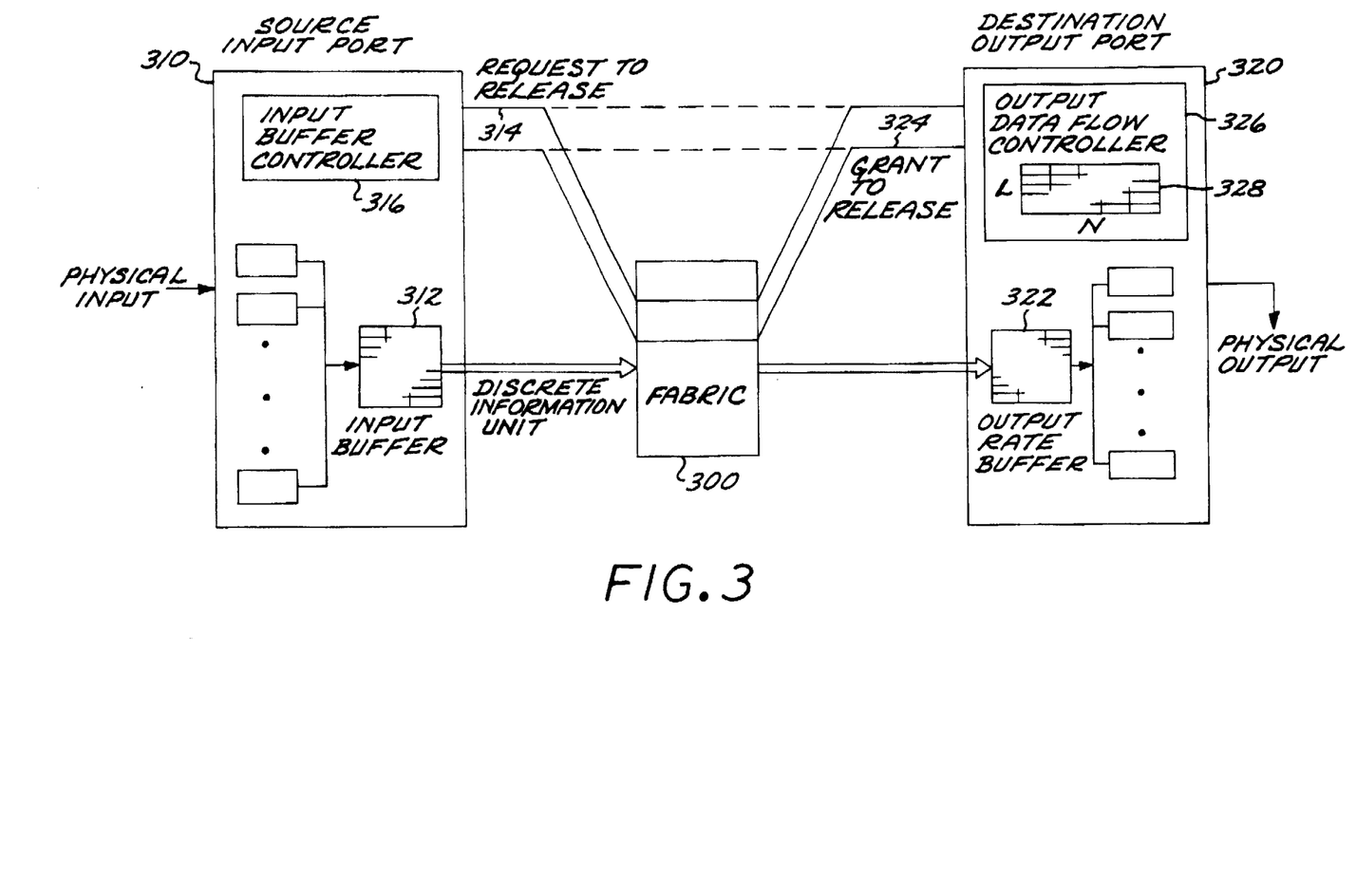
FIG. 3 is a block diagram showing in greater detail the control flow between the input buffer control unit and the output data flow control unit as well as the data flow between the input buffer unit and the output rate buffer unit.

FIG. 3 isolates, for a particular discrete information unit, the source input port 310 and the destination output port 320, connected by the switch fabric 300. The source input port and the destination output port exchange handshaking signals used for data flow control. In one embodiment of the invention, these handshaking signals consist simply of a "Request" to release a discrete information unit (signal 314, directed from the source input port's input buffer control unit 3160 to the destination output port's output data flow control unit 3260) and a "Grant" to release a discrete information unit (signal 324, directed from the destination output port's output data flow control unit to the source input port's input buffer control unit). These handshaking signals may be exchanged through the switch fabric 300 or may be exchanged "out of band." Each "Request" signal and each "Grant" signal include identification of the respective input source port and the priority pertaining to the discrete information unit, and its destination output port.

In order to implement an appropriate buffer control strategy, the output data flow control unit 3262 within each destination output port 320 must know the state of the various queues within all of the source input ports that have discrete information units destined for it. For this purpose, a memory 3286 is provided within each output data flow control unit, having logical dimensions N×L. Each time the output data flow control unit 3264 receives a "Request" signal 314, it increments a value stored in a corresponding memory location, based on the "Request's source input port identification and the priority level of the request.

The basic control algorithm implemented by the output data flow control unit is as follows. A discrete information unit (e.g., an ATM cell) destined for a particular destination output port comes into a source input port. The source input port's input buffer control unit sends a "Request" to release a discrete information unit to the destination output port's 'output data flow control unit'. The "Request" contains information identifying the source input port, the output destination port, and the priority or class of the discrete information unit. The destination output port's 'output data flow control unit' responds eventually with a "Grant" to release the discrete information unit back to the originating source input port's input buffer control unit. The "Grant" contains information identifying the originating source input port, the destination output port issuing the "Grant", and the priority or class of the "Grant". The source input port's input buffer control unit then releases the discrete information unit to the switch fabric for final delivery to the destination output port's output rate buffer unit. Various elaborations of this basic algorithm are possible, as described hereinafter. Nevertheless, at a fundamental level, this basic algorithm, despite its apparent simplicity, confers a significant advance over the buffer control methods of the prior art.

Figure 4:
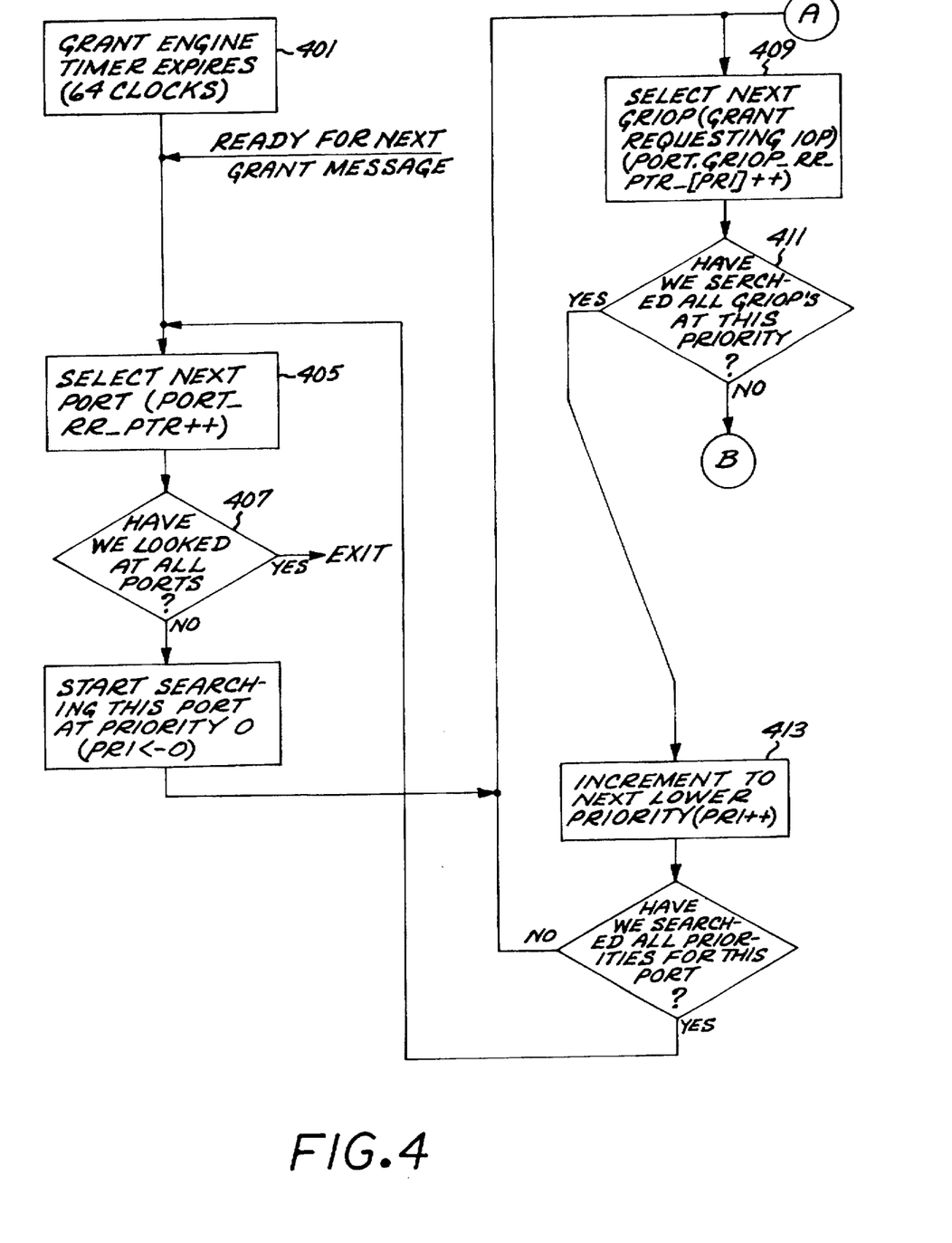
FIG. 4 and FIG. 5 are respective portions of a flowchart used to describe a buffer control procedure in accordance with one embodiment of the present invention.

Referring to FIG. 4, the buffer control algorithm, implemented in the output data flow control logic in accordance with a preferred embodiment of the invention, will be described in greater detail.

In a preferred embodiment, each output data flow control unit may control one or more destination output ports. The output data flow control unit maintains individual data for each destination output port under its control. Further, in a preferred embodiment, the source input ports may be grouped such that a single input buffer control unit will support one or more source input ports. When the source input ports are grouped, the input buffer control unit will continue to queue the discrete information unit by its output destination port and its priority or class. The input buffer control unit maintains the exact ordering of the received discrete information units from any of its source input ports. The (source input port's) input buffer control unit generates the "Requests" to release a discrete information units to the appropriate (destination output port's) output data flow control unit.

The output data flow control unit is allowed only a certain number of total "Grants" to be outstanding at any given time. Each output data flow control unit may also be allowed only a certain number of "Grants" to be outstanding within different priorities or classes. For example, an output data flow control unit may be allowed a specified number of outstanding "Grants" for high priority (e.g., CBR, or Constant Bit Rate) traffic, a specified number of outstanding "Grants" for medium priority (e.g., VBR, or Variable Bit Rate) traffic, and a specified number of outstanding "Grants" for low priority (e.g., ABR, or Available Bit Rate and UBR, or Undefined Bit Rate) traffic. A further restriction may be placed on the number of "Grants" that may be outstanding to any single source input port or any single input buffer control unit (in the case where a single input buffer control unit services more than one source input port). Accordingly, a further restriction may be placed the number of "Grants" that may be outstanding to any single destination output port (in the case where a single output data flow control unit services more than one destination output port). Moreover, the output data flow control unit is not allowed to issue "Grants" at will. Rather, successive "Grants" must be spaced apart by some minimum amount of time. Therefore, in Step, 401 the output data flow control unit waits until its "Grant" engine timer has expired.

Referring momentarily to FIG. 3, cells must enter the fabric 300 by way of an input buffer unit 3126. Similarly, cells must leave the fabric 300 by way of an output rate buffer unit 3228. If there is no room in the output rate buffer unit issuing a new Grant might cause existing data to be overwritten.

Figure 5:
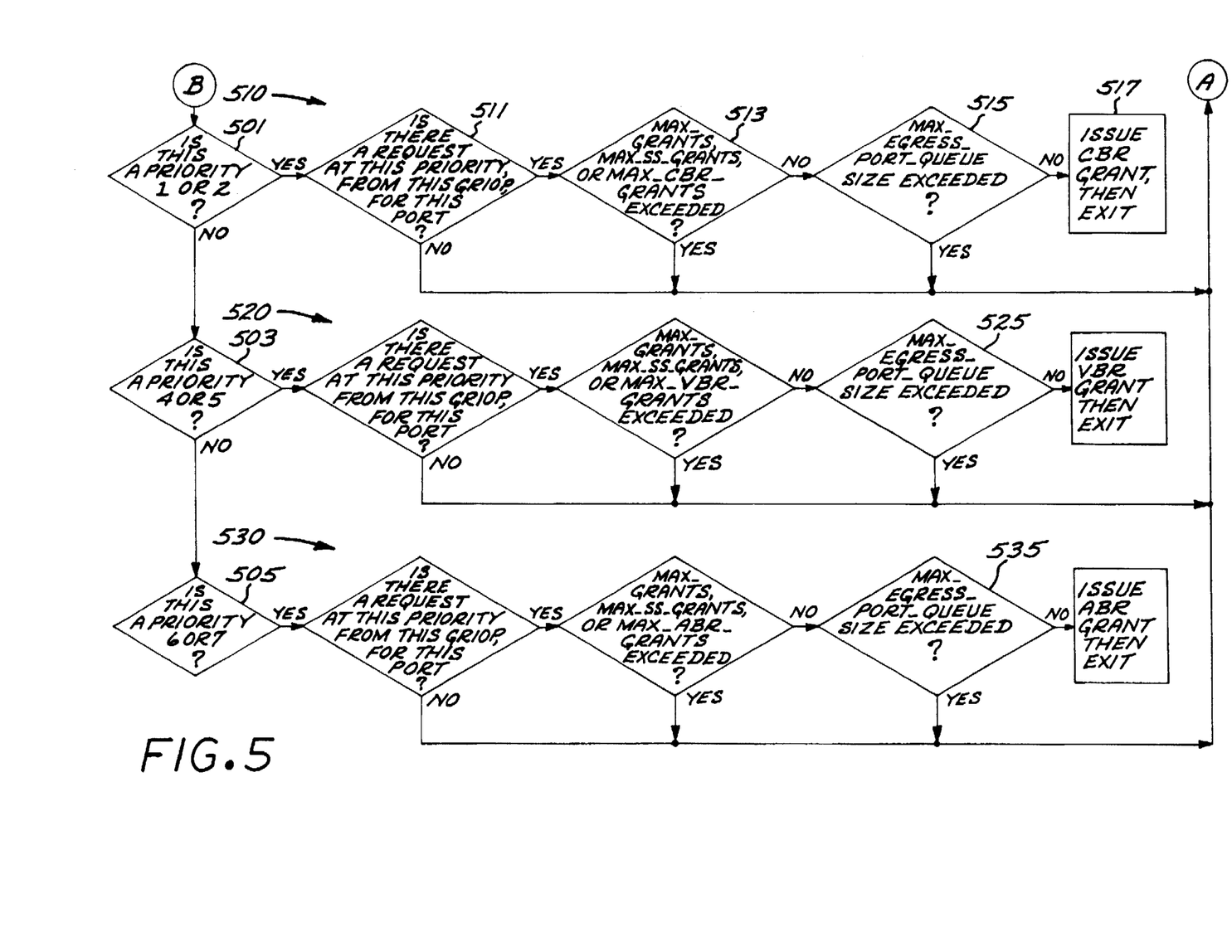

Therefore, in Steps 515, 525 and 535, the program checks to see if there is room in the output rate buffer unit before issuing a new "Grant". Only if there is room in the output rate buffer unit does the program continue to search for a serviceable request.

The basic search algorithm, in accordance with one embodiment of the invention, proceeds as follows: 1) service active destination output ports round-robin; 2) for each destination output port, start with "Requests" having the highest relative priority; 3) if there is more than one such "Request", conduct a round-robin selection by source input port or input buffer control unit, whichever applies.

In Step 405 therefore, the program selects the next destination output port in round-robin order. If all of the destination output ports have already been considered and none of them are able to accept another discrete information unit (Step 407), then the routine exits. Otherwise, the program starts searching for "Requests" for discrete information units destined to the selected destination output port at priority 0 (highest priority). Searching proceeds in Step 409 by selecting the next "Grant"-requesting source input port (or input buffer control unit) within the round-robin ordering of source input ports (or input buffer control units). If all source input ports (or input buffer control units) have already been searched at this priority without finding a serviceable "Request" (Step 411), then the next lower priority is selected (Step 413). If all priorities for the current output destination port have already been searched, then program flow proceeds to Step 405, and the next output destination port is selected. Otherwise, the next source input port (or input buffer control unit) for the new (lower) priority is selected, etc.

Assuming that in Step 411 the determination is made that not all source input ports (or input buffer control units) have been searched at the current priority, then program flow proceeds to point B in FIG. 5. Referring to FIG. 5, in a preferred embodiment, program flow follows one of three paths depending on the priority of the "Request". If the priority is 1 or 2 (Step 501), then the "Request" is a CBR "Request", and program flow follows path 510. If the priority is 4 or 5 (Step 503), then the "Request" is a VBR "Request", and program flow follows path 520. If the priority is 6 or 7 (Step 505), then the "Request" is an ABR "Request", and program flow follows path 530. Priorities 0 and 3 are used for other purposes not germane to the present invention.

The program flow paths 510, 520 and 530 are essentially the same. Considering program flow path 510, in Step 511, the program determines whether there is a "Request" at the selected priority, from the selected source input port (or input buffer control unit), for the selected destination output port. If not, then program flow returns to point A in FIG. 4. If so, then various "Grant" limitations are checked in Step 513, including whether the total number of outstanding "Grants" from this output data flow control unit (MAX_GRANTS), the number of outstanding "Grants" to a single source input port (or input buffer control unit) (MAX_SS_GRANTS), or the number of outstanding "Grants" from this output data flow control unit for this particular class of requests (e.g., MAX_CBR_GRANTS) would be exceeded by issuing a "Grant". If any of these limits would be exceeded, then program flow returns to point A in FIG. 4. If none of these limits would be exceeded, then the program checks in Step 515, based on information received from the output rate buffer unit whether a further limit, MAX_EGRESS_PORT_QUEUE, would exceed the destination output port's maximum allowable buffer usage by issuing a "Grant" to this specific output destination port. If so, then program flow returns to point A in FIG. 4.

If the determination is in Steps 513 and 515 that none of the limits would be exceeded by issuing a "Grant", then the output data flow control unit will proceed in Step 517 to issue a "Grant" of the appropriate class (e.g., CBR) and then exits the "Grant" processing routine.

The foregoing "Grant" processing routine may be implemented in software using a general-purpose microprocessor. More preferably, the "Grant" processing routine is implemented in hardware as part of an Application Specific Integrated Circuit (ASIC). In the latter instance, the flow diagram of FIGS. 4 and 5 describes not the execution of program instructions but describes the logical operation of the ASIC.

In the embodiment described, each output data flow control unit keeps count of each received "Request" such that it knows the exact number of discrete information units queued up for each destination output port at each of the input buffer units. This method requires a large amount of storage. In actuality, the output data flow control unit does not need to know the exact number of "Requests" at each priority. It only needs to know, at a given point in time, whether there is at least one "Request" at a given priority.

Alternative embodiments are possible that reduce the storage requirements of the output data flow control unit. In one alternative embodiment, each input buffer control unit sends, at intervals, to each output data flow control unit for which it has traffic, an update message containing sufficient information to enable the output data flow control unit to determine which "Grant" to send out. Because at the time an update message is sent, the input buffer control unit knows the amount time that will elapse before another update message will be sent, it sends enough information for each of the source input ports it supports such that if a single source input port were to receive all of the "Grants" from an output data flow control unit until the next update message is sent, the output data flow control unit would still have an accurate count for any source input port in any input buffer unit.

Imagine, for example, the case of an input buffer control unit (and its corresponding input buffer unit) supporting a single source input port. Assume further that from one update message to the next three "Grants" may be issued. If the input buffer unit had, say, four priority 1 discrete information units destined for a particular destination output port, it would send a message to the appropriate output data flow control unit containing "1, 1, 1" indicating the sending input buffer unit has enough priority 1 requests to use three successive priority 1 "Grants". At another time, the input buffer unit might have a single priority 1 discrete information unit and two priority 2 discrete information units. It would then send an update message to the appropriate output data flow control unit containing "1, 2, 2."

Various other arrangements of conveying information from the source input buffer units to the destination output data flow control units will be apparent to one of ordinary skill in the art.

In the foregoing manner, a digital traffic switch may be provided that enjoys "the best of both world," i.e., enjoys the advantages of input queuing (scalability, reduced congestion) without the disadvantages of input control, and enjoys the advantages of output control (more nearly optimal efficiency) without the disadvantages of output queuing.

It will be appreciated by those of ordinary skill in the art that the invention can be embodied in other specific forms without departing from the spirit or essential character thereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method of controlling buffering of a discrete information unit of digital data, for use within a digital switch having multiple source input ports, multiple destination output ports, and a switch fabric for switching a discrete information unit received at any of the source input ports to any of the destination output ports, wherein each source input port is associated with one of a plurality of input ports each including an input buffer and an input buffer controller and wherein each destination output port is associated with one of a plurality of output units each including an output rate buffer and an output rate flow controller, the method comprising the steps of:

receiving at a particular source input port a discrete information unit destined for a final destination output port;

buffering the discrete information unit within a particular input buffer associated with the particular source input port, a corresponding input buffer controller registering queue state information for the particular input buffer;

communicating at least part of the particular input buffer's queue state information to a particular output data flow controller associated with the final destination output port;

incrementing a value in an output rate buffer corresponding to the particular output data flow controller to indicate that the discrete information unit is buffered within the particular input buffer;

the particular output data flow controller monitoring status of the corresponding output rate buffer and, in response to the particular input buffer's queue state information, generating control information which is communicated back to the corresponding input buffer controller for the release of the discrete information unit to the switch fabric; and the corresponding output rate buffer delivering the discrete information unit to the final destination output port.

2. A method of controlling buffering of a discrete information unit of digital data, for use within a digital switch having multiple source input ports, multiple destination output ports, and a switch fabric for switching a discrete information unit received at any of the source input ports to any of the destination output ports, wherein each source input port is associated with one of a plurality of input units each including an input buffer and an input buffer controller and wherein each destination output port is associated with one of a plurality of output units each including an output rate buffer and an output rate flow controller, the method comprising the steps of:

receiving at a particular source input port a discrete information unit destined for a final destination output port, the discrete information unit having a specified priority;

buffering the discrete information unit within a particular input buffer associated with the particular source input port, a corresponding input buffer controller generating a "Request" to release the discrete information unit from the input buffer;

communicating the "Request" to a particular output data flow controller associated with the final destination output port;

the particular output data flow controller monitoring status of a corresponding output rate buffer and, in response to the particular input buffer's "Request", generating a "Grant" which is communicated back to the corresponding input buffer controller for the release of the discrete information unit to the switch fabric, the "Grant" designating the final destination output port and the specified priority;

the corresponding input buffer controller, in response to the "Grant" from the particular output data flow controller, releasing from the particular input buffer a particular discrete information unit destined for the final destination output port and having the specified priority as designated by the "Grant";

the particular discrete information unit traversing the switch fabric to the corresponding output rate buffer; and the corresponding output rate buffer delivering the particular discrete information unit to the final destination output port.

3. A method of controlling buffering of a discrete information unit of digital data, for use within a digital switch having multiple source input ports, multiple destination output ports, and a switch fabric for switching a discrete information unit received at any of the source input ports to any of the destination output ports, wherein multiple source input ports are associated with each of a plurality of input units each including an input buffer and an input buffer controller, and wherein multiple destination output ports are associated with each of a plurality of output units each including an output rate buffer and an output rate flow controller, the method comprising the steps of:

receiving at the multiple source input ports associated with a particular input buffer unit particular discrete information units each specifying a destination output port and a priority level or class;

buffering within the input buffer of the particular input buffer unit the particular discrete information according to their destination output port and their priority level or class;

the input buffer controller of the particular input buffer unit generating a "Request" to release from the input buffer a discrete information unit destined for a particular destination output port;

a particular output data flow controller with which the particular destination output port is associated monitoring status of its associated destination output ports, receiving the "Request" and, in response to the "Request", generating a "Grant" to release from the input buffer into the switch fabric a discrete information unit destined for the particular destination output port and having a specified priority level or class;

the input buffer controller, in response to the "Grant" from the output data flow controller, releasing from the input buffer into the switch fabric a matching one of said particular discrete information units destined for the particular destination output port and having the specified priority level or class;

the matching discrete information unit traversing the switch fabric to the corresponding output rate buffer; and the corresponding output rate buffer delivering the matching discrete information unit to the final destination output port.

4. A method of controlling buffering of discrete information units of digital data, for use within a digital traffic switch having multiple source input ports, multiple destination output ports, a switch fabric, having an input side and an output side, for switching a discrete information unit received at any of the source input ports to any of the destination output ports, an input buffer unit, an input buffer controller, and an output buffer unit, the method comprising the steps of:

buffering within the input buffer unit discrete information units received at the source input ports;

generating a request to release from the input buffer unit a discrete information unit destined for a particular destination output port;

incrementing a value in the output buffer unit in association with the particular destination output port to indicate that the discrete information unit is buffered within the input buffer unit in association with a particular source input port; and the input buffer controller monitoring status of the destination output ports and, in response to the request, generating a grant to release from the input buffer unit the discrete information unit destined for the particular destination output port.

5. A method of controlling buffering of discrete information units of digital data, for use within a digital switch having multiple input buffer units, each having multiple source input ports, and multiple output buffer units, each having multiple destination output ports, the digital switch further having a switch fabric, having an input side and an output side, for switching a discrete information unit received at any of the source input ports to any of the destination output ports, the method comprising the steps of:

buffering within an input buffer unit discrete information units received at source input ports;

generating a request to release from the input buffer unit a discrete information unit destined for a particular destination output port;

communicating the request to the output buffer unit corresponding to the particular destination output port;

incrementing a value in the output buffer unit to indicate that the discrete information unit is buffered within the input buffer unit in association with a particular source input port; and the output buffer unit monitoring the status of its output including the particular destination output port and, in response to the request, generating a grant to release from the input buffer unit the discrete information unit destined for the particular destination output port.

6. The method of claim 5, wherein the step of buffering comprises separately queuing groups of discrete information units, each discrete information unit within a group of discrete information units being destined for a same destination output port.

7. The method of claim 6, wherein the step of buffering further comprises:

including within each discrete information unit an indication of priority of that discrete information unit from among a predetermined number of possible priorities;

wherein each discrete information unit within a group of discrete information units is destined for a same destination output port and has a same priority.

8. The method of claim 7, comprising the further steps of:

buffering within other input buffer units discrete information units received at source input ports of the other input buffer units;

generating requests to release from respective ones of the other input buffer units a discrete information unit destined for other particular destination output ports of the output buffer unit; and the output buffer unit, in response to the requests, storing information indicating, for each combination of source input port and priority, whether at least one discrete information unit having that priority is buffered within a corresponding input buffer unit.

9. The method of claim 8, wherein the step of generating a grant comprises:

identifying an input buffer unit within which a discrete information unit destined for the output buffer unit is buffered;

identifying a highest relative priority of discrete information units destined for the output buffer unit and buffered within the input buffer unit identified previously;

identifying, from among source input ports at which the one or more discrete information units having a highest relative priority were received, a particular source input port; and from among one or more discrete information units having a highest relative priority, sending a grant for a discrete information unit received at the particular source input port.

10. The method of claim 9, wherein the step of identifying an input buffer comprises selecting round-robin, within a predetermined order of input buffer units, a next input buffer unit relative to an input buffer unit previously selected, within which a discrete information unit destined for the output buffer unit is buffered.

11. The method of claim 10, wherein the step of identifying a source input port comprises selecting round-robin, within a predetermined order of source input ports, a next source input port relative to a source input port previously selected, at which a discrete information unit destined having the highest relative priority was received.

12. The method of claim 11, wherein the selection of a source input port is subject to a limit on the number of outstanding grants to a single source input port.

13. The method of claim 10, wherein the selection of an input buffer unit is subject to a limit on the number of outstanding grants to a single input buffer unit.

14. The method of claim 10, wherein the selection of a highest relative priority is subject to a limit on the number of outstanding grants for a particular priority.

15. The method of claim 8, wherein the step of generating a grant comprises:

identifying from the stored information a highest relative priority of discrete information units destined for the output buffer unit;

identifying, from among the source input ports at which the discrete information units having a highest relative priority were received, the next source input port relative to the source input port previously selected in a round-robin selection order; and sending a grant for a discrete information unit received at the identified source input port.

16. A digital traffic switch, comprising:

a plurality of source input ports;

a plurality of destination output ports;

an input buffer unit coupled to the input ports;

a switch fabric coupled to the input buffer unit and the output ports; and a buffer controller, coupled to the input buffer unit and the output ports, for receiving requests to release from the input buffer unit discrete information units destined for particular output ports, for incrementing a value in output buffers to indicate that discrete information units destined for particular output ports have arrived at particular input ports, for monitoring status of the output ports, and for generating grants to release from the input buffer respective ones of the discrete information units.

* * * * *